(12) United States Patent
Shaker et al.

(10) Patent No.: US 11,544,558 B2
(45) Date of Patent: Jan. 3, 2023

(54) CONTINUAL LEARNING OF ARTIFICIAL INTELLIGENCE SYSTEMS BASED ON BI-LEVEL OPTIMIZATION

(71) Applicant: NEC Laboratories Europe GmbH, Heidelberg (DE)

(72) Inventors: Ammar Shaker, Heidelberg (DE); Francesco Alesiani, Heidelberg (DE); Xiao He, Hangzhou (CN)

(73) Assignee: NEC CORPORATION, Tokyo (JP)

( * ) Notice: Subject to any disclaimer, the term of this patent is extended or adjusted under 35 U.S.C. 154(b) by 508 days.

(21) Appl. No.: 16/697,259

(22) Filed: Nov. 27, 2019

(65) Prior Publication Data

US 2021/0064989 A1     Mar. 4, 2021

Related U.S. Application Data

(60) Provisional application No. 62/893,826, filed on Aug. 30, 2019.

(51) Int. Cl.
*G06N 3/04*     (2006.01)
*G06N 3/08*     (2006.01)

(52) U.S. Cl.
CPC .............. *G06N 3/08* (2013.01); *G06N 3/04* (2013.01)

(58) Field of Classification Search
CPC .................................. G06N 3/04; G06N 3/08
USPC ........................................................ 706/25
See application file for complete search history.

(56) References Cited

U.S. PATENT DOCUMENTS

| 10,162,794 | B1 | 12/2018 | Arel et al. | |
| 11,281,969 | B1* | 3/2022 | Rangapuram | G06Q 10/04 |
| 2021/0056378 | A1* | 2/2021 | Yang | G06N 20/00 |

FOREIGN PATENT DOCUMENTS

| CN | 109544475 A | * | 3/2019 | ............. G06T 5/002 |
| DE | 202019103323 U1 | * | 8/2019 | |

OTHER PUBLICATIONS

Franceschi, Luca et al. "Forward and Reverse Gradient-Based Hyperparameter Optimization," Proceedings of the 34th International Conference on Machine Learning, Sydney, Australia, PMLR 70, arXiv:1703.01785v3, Dec. 12, 2017.

Riemer, Matthew et al. "Learning to Learn without Forgetting by Maximizing Transfer and Minimizing Interference," arXiv:1810.11910v3, May 3, 2019.

Li, Xilai et al. "Learn to Grow: A Continual Structure Learning Framework for Overcoming Catastrophic Forgetting," Proceedings of the 36th International Conference on Machine Learning, Long Beach, California, PMLR 97, arXiv:1904:00310v3, May 21, 2019.

(Continued)

*Primary Examiner* — Melur Ramakrishnaiah
(74) *Attorney, Agent, or Firm* — Leydig, Voit & Mayer, Ltd.

(57) ABSTRACT

A method of continual learning in an artificial intelligence system through bi-level optimization includes providing a stored data sample of a current task and providing a neural network subdivided into two parts including a parameter part and a hyper-parameter part. The method further includes performing bi-level optimization by separately training the two parts of the neural network. The neural network has been trained, prior to the bi-level optimization, on data samples of previous tasks.

17 Claims, 14 Drawing Sheets

(56) References Cited

OTHER PUBLICATIONS

Hou, Saihui et al. "Lifelong Learning via Progressive Distillation and Retrospection," ECCV, Sep. 2018.
Helmini, Suleka, "How to Automate Hyperparameter Optimization," Medium, May 30, 2019.
Schwarz, Jonathan et al. "Progress & Compress: A scalable framework for continual learning," Proceedings of the $35^{th}$ International Conference on Machine Learning, Stockholm, Sweden, PMLR 80, Jul. 2018.
Masumura, Ryo et al. "Adversarial Training for Multi-task and Multi-lingual Joint Modeling of Utterance Intent Classification," Proceedings of the 2018 Conference on Empirical Methods in Natural Language Processing, pp. 633-639, Brussels, Belgium, Oct. 31-Nov. 4, 2018.
Feurer, Matthias et al. "Hyperparameter Optimization," Automated Machine Learning, The Springer Series on Challenges in Machine Learning, May 18, 2019.
"ML Tuning: model selection and hyperparameter tuning," Apache Spark 2.2.0 Documentation, Dec. 2018.
Javed, Khurram et al. "Meta-Learning Representations for Continual Learning," $33^{rd}$ Conference on Neural Information Processing Systems (NeurIPS 2019), Vancouver, Canada, arXiv:1905:12588v2, Oct. 30, 2019.
Alonso, Hector Martinez et al. "When is multitask learning effective? Semantic sequence prediction under varying data conditions," arXiv:1612.02251v2, Jan. 10, 2017.

\* cited by examiner

CONTINUAL LEARNING OF ARTIFICIAL INTELLIGENCE SYSTEMS BASED ON BI-LEVEL OPTIMIZATION

CROSS-REFERENCE TO RELATED APPLICATION

The present application claims priority to U.S. Provisional Application No. 62/893,826, which was filed on Aug. 30, 2019, and is hereby incorporated by reference herein (including any appendices or attachments thereto).

FIELD

The present invention relates to a method and system for continual learning of artificial intelligent systems based on bi-level optimization.

BACKGROUND

Artificial intelligence systems (also called "machine learning systems") can be configured to learn a specific task from labeled examples (e.g., labeled input-output data pairs) as in supervised learning or training, from both labeled and unlabeled examples as in semi-supervised learning or training, and through a generic feedback function as in reinforcement learning or training. Franceschi et al., "Forward and Reverse Gradient-Based Hyper-parameter Optimization," ArXiv:1703.01785 [Stat], (Mar. 6, 2017), which is hereby incorporated by reference herein, studied procedures (reverse-mode and forward-mode) for computing the gradient of the validation error with respect to the hyper-parameters of an iterative learning algorithm such as stochastic gradient descent.

Eventually, a trained system might be exposed to a new and unfamiliar environment (also called a "new task") in which the desired distribution of input and output data is different than the distribution of input and output data encountered during training. Examples of new tasks are when a trained robot operates in a new environment or when new categories (e.g., classifications) are added to trained image recognition system.

Within machine learning, the field of continual learning endeavors to finds an architecture and a learning or training algorithm that allows the learning of new tasks while not forgetting the past tasks, without the necessity to store the previous experience, re-train the full network or store multiple networks per task. Riemer et al., "Learning to Learn without Forgetting by Maximizing Transfer and Minimizing Interference" ArXiv:1810.11910 [Cs, Stat], (Oct. 28, 2018), which is hereby incorporated by reference herein, found a lack of performance when it comes to continual learning over non-stationary distributions of data.

SUMMARY

In an embodiment, the present invention provides a method of continual learning in an artificial intelligence system through bi-level optimization. The method includes providing a stored data sample of a current task and providing a neural network subdivided into two parts including a parameter part and a hyper-parameter part. The method further includes performing bi-level optimization by separately training the two parts of the neural network. The neural network has been trained, prior to the bi-level optimization, on data samples of previous tasks.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
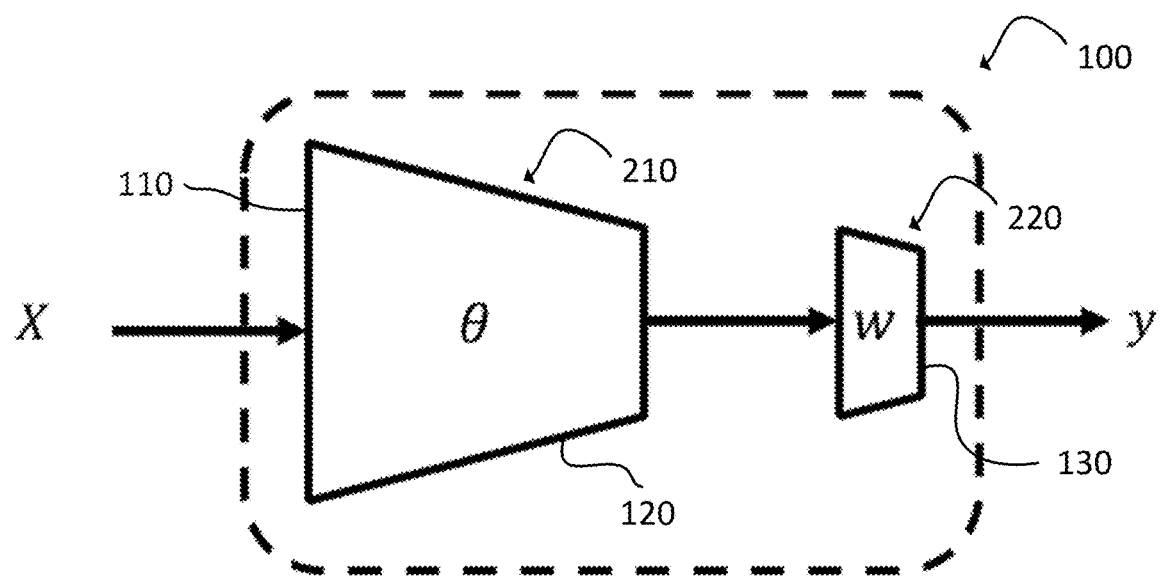
FIG. 1 illustrates a neural network split (single head) according to an embodiment.

Embodiments of the present invention provide for bi-level continual learning methods that extend machine learning architecture reducing the effect of catastrophic forgetting when series of tasks (e.g., new tasks) are presented to machine learning system. Embodiments of the present invention enable high accuracy for the current task (e.g., a new task), and at the same time retain high performance on previously seen tasks. Therefore, embodiments of the present invention enable a smaller sized neural network to exhibit the high accuracy associated with larger neural networks, thereby reducing computational resources devoted to saving and instantiating the neural network.

Accordingly, embodiments of the present invention address the balance between the performance of the current task (e.g., a new task) with the accuracy retained of the previous tasks. In an embodiment, the term "accuracy" is a metric that quantifies the performance of a supervised learning algorithm by comparing the predicted output with the ground-truth.

Embodiments of the present invention provide a method that separates neural network (NN) components (as parameters/components) into two parts that are identified as parameters (also called "base" or "first" parameters) and as hyper-parameters (also called "second parameters"), respectively. The two parts (also called "components") can be trained iteratively on two separate data sets and two cost or error functions. In an embodiment, one part (e.g., base parameters) is trained with task-specific data and another part (e.g., hyper-parameters) is trained with the validation data from all tasks (e.g., data common to all tasks). The training can be performed by defining the problem as bi-level problem and using a bi-level optimization solver. An exemplary bi-level problem is defined with cost functions such that the optimization learns new tasks while retaining the performance of previous ones.

According to an embodiment, a method is provided for continual learning of artificial intelligence systems (including, e.g., machine learning models such as neural networks) based on bi-level optimization. The method includes the steps of: receiving data from the current task and store it for later use; subdividing two parts of the neural networks into parameters and hyper-parameters; separating training according to the bi-level optimization of the two networks' parts, once conditioned to the performance of all stored samples of the previous tasks; and iteratively improving the performance using different batches of the memory and current data.

As is apparent from the present disclosure, embodiments of the present prevention provide improvements to machine learning technology, which is inherently computer and computer-network related. Specific, non-limiting improvements provided by embodiments include increasing prediction accuracy for the current task while retaining high performance on previously seen tasks, and using computational resources more efficiently.

A method of continual learning in an artificial intelligence system through bi-level optimization includes providing a stored data sample of a current task and providing a neural network subdivided into two parts including a parameter part and a hyper-parameter part. The method further includes performing bi-level optimization by separately training the two parts of the neural network. The neural network has been trained, prior to the bi-level optimization, on data samples of previous tasks.

In an embodiment, the method includes after performing the bi-level optimization, iteratively batch training the neural network based on batches of data collectively comprising: (i) at least some of the previous task data samples and (ii) the stored current task data sample.

In an embodiment, performing the bi-level optimization includes: iteratively training the parameter part of the neural network with a first data set and a first cost function; and iteratively training the hyper-parameter part of the neural network with a different second data set and a different second cost function; wherein one of the first data set and the second data set comprises the stored current task data sample and the other of the first data set and the second data set comprises one or more of: (i) the stored current task data sample and (ii) at least some of the previous task data samples.

In an embodiment, performing the bi-level optimization includes defining the training of the two parts of the neural network as a bi-level problem and applying a bi-level optimization solver; wherein the bi-level problem is defined with respect to the first and second cost functions such that the optimization resulting from the bi-level optimization solver causes the parameter part of the neural network to learn one or more new tasks while the hyper-parameter part of the neural network retains performance for previously learned tasks.

In an embodiment, performing the bi-level optimization includes: iteratively training the parameter part of the neural network with data specific to a subset of a group of multiple tasks; and iteratively training the hyper-parameter part of the neural network with validation data common to each of the multiple tasks; wherein the group of multiple tasks comprises the current task and at least some of the previous tasks; and wherein the subset of the group of multiple tasks comprises the current task.

In an embodiment, the bi-level optimization through separate training includes: training the parameter part of the neural network based on data specific to the current task; and training the hyper-parameter part of the neural network based on data common to the current task and the previous tasks.

In an embodiment, the parameter part includes one or more first layers of the neural network and the hyper-parameter part includes one or more different second layers of the neural network.

In an embodiment, the bi-level optimization through separate training includes: training the parameter part of the neural network based on first training data, but not on second training data; and training the hyper-parameter part of the neural network based on the first training data and the second training data; wherein the first training data comprises the stored current task data sample and the second training data comprises stored previous task data samples.

In an embodiment, the parameter part includes one or more first layers of the neural network and the hyper-parameter part comprises one or more different second layers of the neural network. In an embodiment, the one or more first layers include an exit layer of the neural network and the one or more second layers include a plurality of hidden layers of the neural network.

In an embodiment, providing the neural network subdivided into two parts including the parameter part and the hyper-parameter part includes: selecting the parameter part from a plurality of options based on data captured by a sensor.

In an embodiment, a tangible, non-transitory computer-readable medium includes instructions thereon which, upon being executed by one or more processors, alone or in combination, provide for execution of the method.

A system includes one or more processors, which alone or in combination, are configured to provide for performance of a method including: providing a stored data sample of a current task; providing a neural network subdivided into two parts including a parameter part and a hyper-parameter part; and performing bi-level optimization by separately training the two parts of the neural network. The neural network has been trained, prior to the bi-level optimization, on data samples of previous tasks.

In an embodiment, the one or more processors, alone or in combination, are further configured to provide for performance of: after performing the bi-level optimization, iteratively batch training the neural network based on batches of data collectively comprising: (i) at least some of the previous task data samples and (ii) the stored current task data sample.

In an embodiment, performing the bi-level optimization includes: iteratively training the parameter part of the neural network with a first data set and a first cost function; and iteratively training the hyper-parameter part of the neural network with a different second data set and a different second cost function. One of the first data set and the second data set includes the stored current task data sample and the other of the first data set and the second data set includes one or more of: (i) the stored current task data sample and (ii) at least some of the previous task data samples.

Continual learning approaches can include a mechanism that prevents changes in the network in directions that disrupt learning of previous tasks and/or generative models that mimic the past tasks. Because forgetting of the network (e.g., forgetting of previous training) can be inevitable when a network exhibits limited learning capacity, the balance of learning new tasks and the ability to remember previous tasks can be actively measured through one or more of the following metrics:

a. Learning Accuracy (LA), which is the average accuracy of a machine learning model across all tasks, after its own training. For example, Learning Accuracy can be the average accuracy of a machine learning model on an old task after training of the old task.

b. Retained Accuracy (RA), which is the average accuracy of the machine learning model across all tasks, after the training of the last task. For example, RA can be the average accuracy of the machine learning model on the old task after training of a new task.

c. Backward Transfer of Information (BTI), which is the average amount lost or gained between the training of a task with respect to the accuracy after the last task. For example, BTI can be the difference between LA and RA (e.g., RA less LA). A negative value can indicate that training of the machine learning model on the new task resulted in accuracy degradation of the old task.

Embodiments of the present invention provide better retained accuracy (RA) than existing methods while having a learning accuracy (LA) consistent with existing methods. As a result, embodiments of the present invention can learn new tasks at least as effectively as existing methods while retaining performance for previous tasks more effectively than existing methods.

Preliminary performances metrics of an embodiment of the invention show that embodiments of the present invention are able to retain performance on past tasks and have very high performance on a current task. The performances are related to MNIST dataset in standard continual learning set up: Permutation and Rotation with 20 tasks.

TABLE 1

| Permutations | | | |
|---|---|---|---|
| | RA | LA | BTI |
| Online | 55.42 | 69.18 | −13.76 |
| Independent | 55.80 | 55.80 | 0.000 |
| Task Input | 80.446 | 81.20 | −0.754 |
| EWC | 62.32 | 75.64 | −13.32 |
| GEM | 83.02 | 80.46 | 2.56 |
| MER | 85.50 | 86.36 | −0.86 |
| BiCL | 83.94 | 87.25 | −3.31 |

A neural network architecture, may, for example, be composed of two components (also called "parts"). In an embodiment, the first component is shared across all tasks and constitutes hidden layers, and the second part is an output layer that captures the task-specific information. In order to learn the parameters of this architecture, embodiments of the present invention employ bi-level optimization and split the network in two parts (also called "components"): parameters and hyper-parameters.

The network may be considered to be composed of only parameters to be trained, while hyper-parameters are related to structural aspect (e.g. size of the network) or linked to the optimization phase (e.g. weights on the cost function or gradient descent parameters). The network can be split into a set of parameters that are common to all tasks and a set of parameters that are task specific. To this end, the network can be divided into two parts or components, where one component is trained on the current task only and the other component is considered common and trained on the validation data of all tasks. In at least this sense, the architecture of embodiments can be different than existing neural network architectures.

Figure 2:
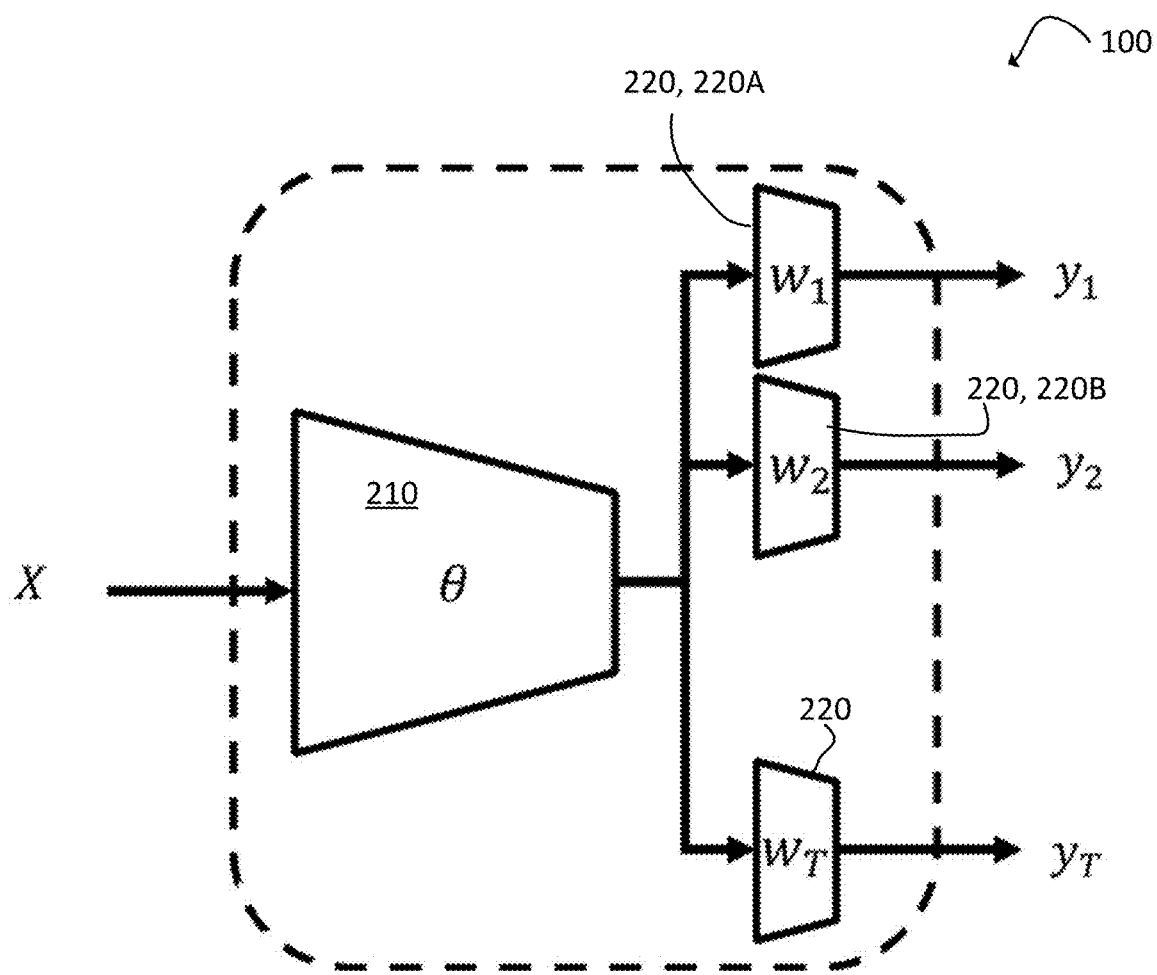
FIG. 2 illustrates a neural network split (multi-head) according to an embodiment.
Figure 3:
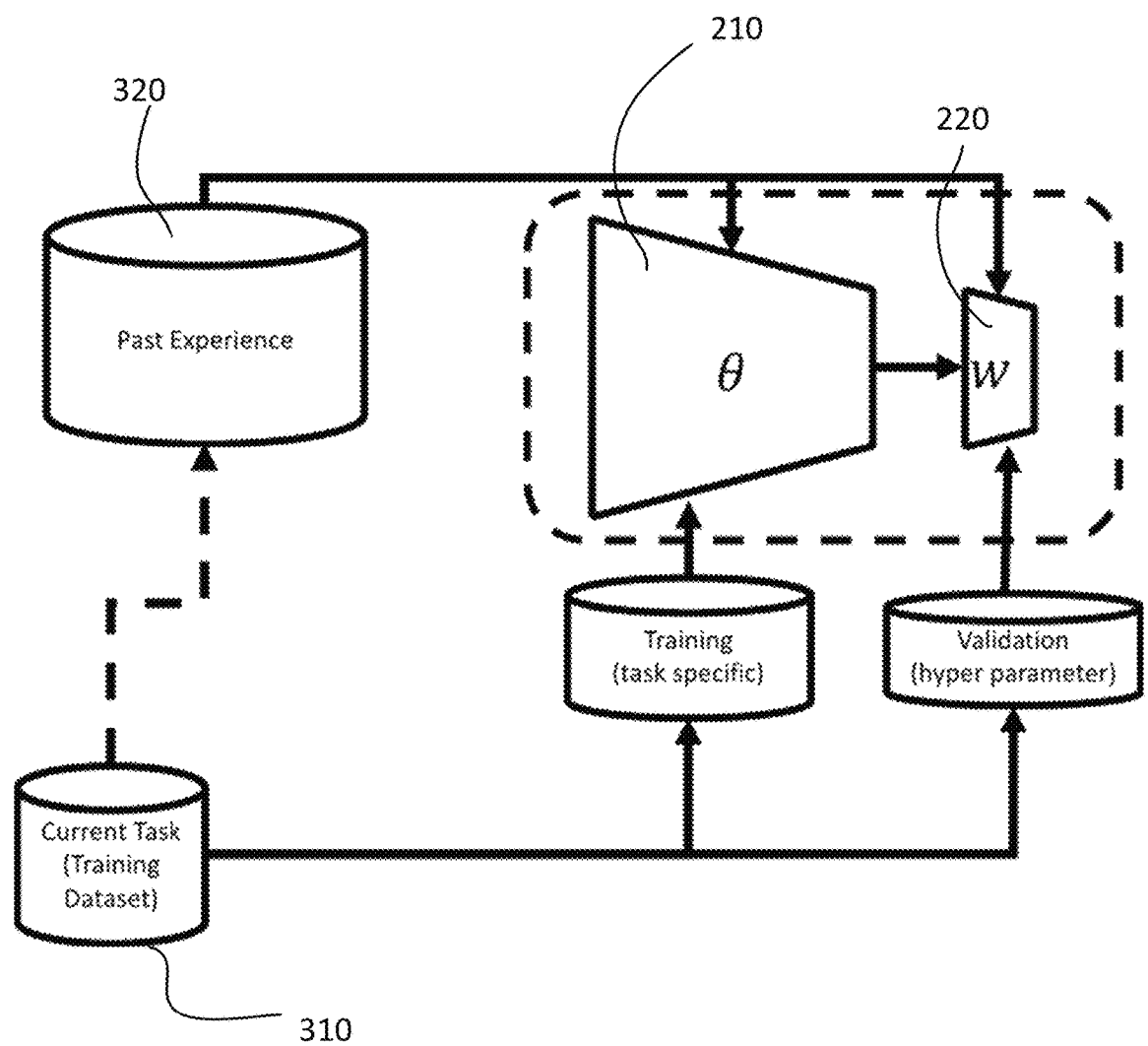
FIG. 3 illustrates neural network training according to an embodiment.
Figure 4:
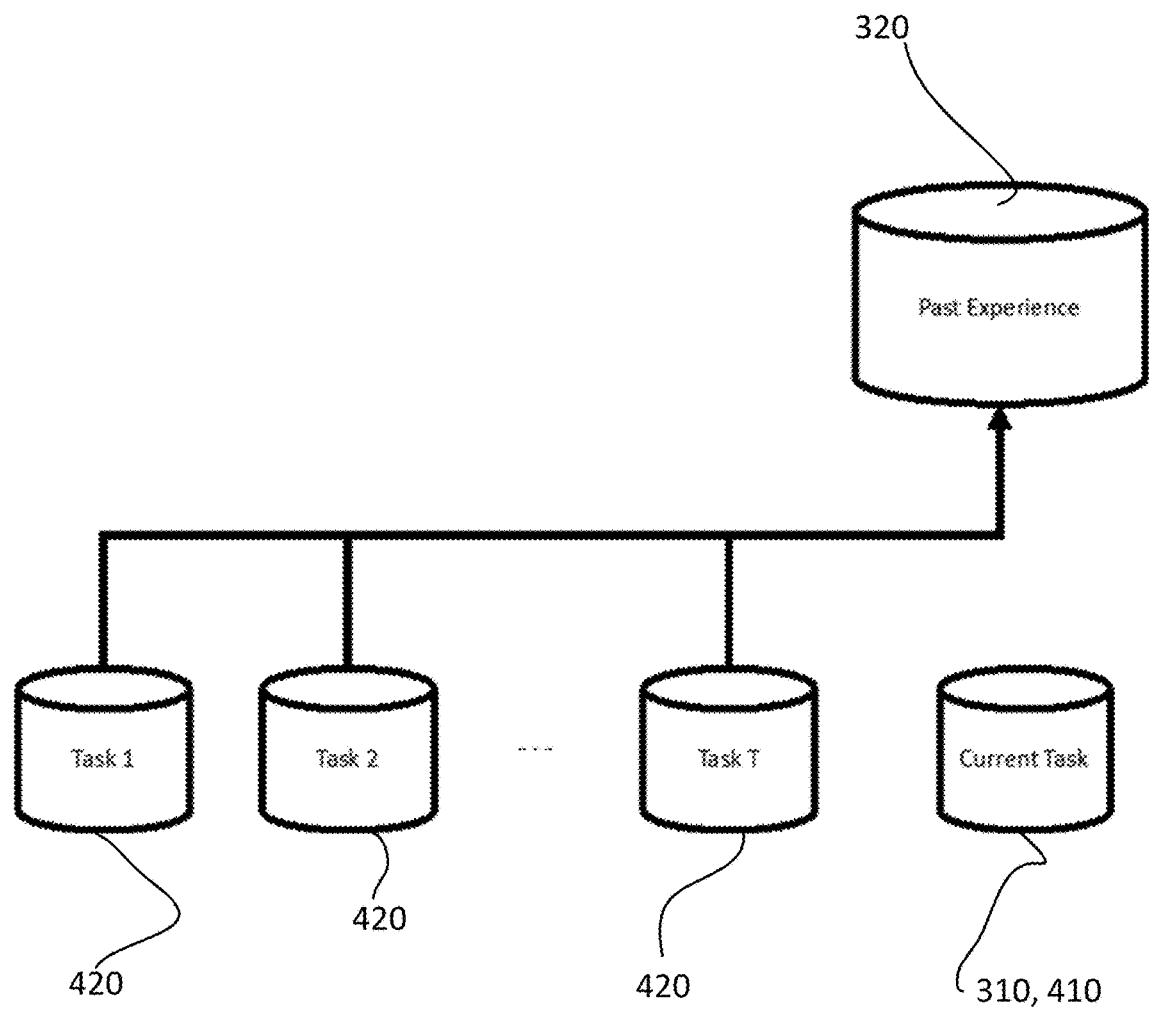
FIG. 4 illustrates sample memory storage according to an embodiment.
Figure 5:
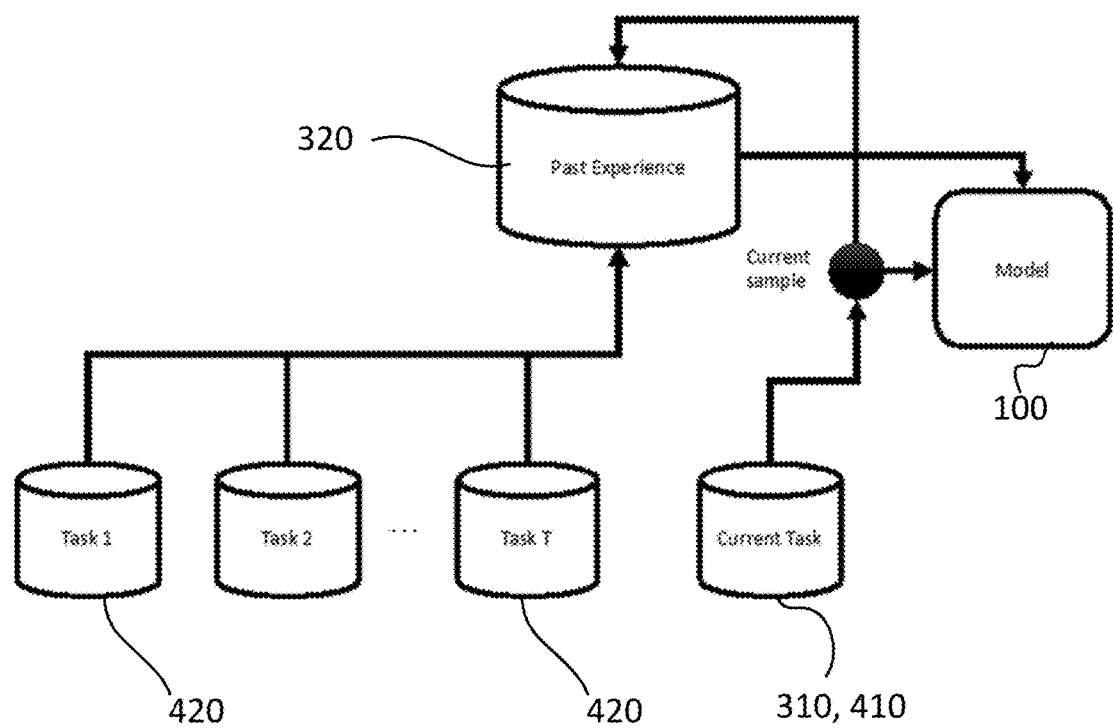
FIG. 5 illustrates continual sample memory storage according to an embodiment.

Embodiments of the present invention are described in connection with FIGS. 1-5. FIG. 1 illustrates a Neural Network Split (single head), FIG. 2 illustrates a Neural Network Split (multi-head), FIG. 3 illustrates Neural Network Training, FIG. 4 illustrates Sample Memory Storage, and FIG. 5 illustrates Continual Sample Memory Storage.

In an embodiment, for the current task $T_i$, the observed training data is split into two sets: one for the task specific training network (training data) and the other of the hyper-parameters part (validation data). For each new task, a small portion of its data is maintained in a data buffer of a fixed size, i.e. the amount of retained data from all previous tasks is independent of the number of tasks. In an embodiment, the data that learns (e.g., trains) the hyper-parameters is referred to as the validation data and the rest as training data. For example, the validation data can be based on all previous tasks. The validation data can be stored in a data buffer of a fixed maximum size (e.g., a predetermined maximum value).

Upon reaching the fixed maximum size, the validation data can discard training data for previous tasks on a first-in-first-out basis. Alternatively, or in addition, the validation data can reduce the resolution of the training data reflecting each task. Put differently, as the number of tasks incorporated within the validation data increase, the validation data can more weakly reflect each task. In an embodiment, two objective functions representing the different losses are defined for the different network's components:

$$\min_{w_j, j \leq i} \mathbb{E}_{(x,y,t) \sim M^{val} \cup D_i^{Val}} \{F(\theta, w_t, x, y)\}$$

$$\hat{\theta} = \arg\min_{\theta} \mathbb{E}_{(x,y,t) \sim M^{Tr} \cup D_i^{Tr}} \{L(\theta, w_t, x, y)\}$$

In an embodiment, (x,y,t) are samples either from the current or from previous tasks. F and L are the two loss functions for the inner and outer problems. In an embodiment, w is the validation part of the network (or hyper-parameters) and θ is the part that is shared between tasks and is fit using the training data.

In an embodiment, the case is considered where the components of the network are exchanged, such that the outer layer becomes the hyper-parameters and the inner layers become the normal or base parameters. Also considered is the case where hyper parameters (e.g., outer layer) is composed by one layer for all tasks (single-headed) or one layer per task (multi-headed).

An embodiment is directed to cost function extension. For example, as an extension of a method of an embodiment, a loss function is used for both upper and lower level, the loss function including the cost of each sample separately and the explicit cost promoting transfer learning. This latter cost component promotes changes in the common direction of the two samples, i.e. the inner product of the partial derivatives is positive.

$$\min_{w_j, j \leq i} \mathbb{E}_{(x,y,t),(x',y',t') \sim M^{Val} \cup D_i^{Val}} \{ F(\hat{\theta}, w_t, x, y) +$$

$$F(\hat{\theta}, w_{t'}, x', y') - \alpha_w \partial_w F(\hat{\theta}, w_{t'}, x, y)^T \partial_w F(\hat{\theta}, w_t, x, y) \}$$

s.t.

$$\hat{\theta} = \arg\min_{\theta} \mathbb{E}_{(x,y,t),(x',y',t') \sim M^{Tr} \cup D_i^{Tr}} \{ L(\theta, w_t, x, y) +$$

$$L(\theta_t, w_{t'}, x', y') - \alpha_\theta \partial_\theta L(\theta, w_t, x, y)^T \partial_\theta L(\theta, w_{t'}, x', y') \}$$

In an embodiment, $\alpha_w$ and $\alpha_\theta$ are two positive constants. The cost function can be implemented using Algorithm A:

---

Algorithm A Continual-Reverse-HG procedure CONTINUALREVERSEHG(w, λ)
    $w_0 \leftarrow w$
    $\lambda_0 \leftarrow \lambda$
    while some condition do
        for $\forall j \in [|B|]$ do
            $B_i^{tr}, B_i^{val} = $ Sample(M,s)
            for $\forall t \in [T]$ do
                Apply k iteration of SGD
                $w_t \leftarrow w_{t-1} + \beta_w(SGD^k(w_{t-1}, \lambda, B^{tr}) - w_{t-1})$
            $\alpha, p \leftarrow \nabla_w L(w_T, \lambda, B^{val}), \nabla_\lambda L(w_T, \lambda, B^{val})$
            for $\forall t \in [T]^{-1} \setminus \{0\}$ do
                $p \leftarrow p - \eta \nabla_\lambda T \nabla_w L(w_{t-1}, \lambda, B^{val}) \alpha$
                $\alpha \leftarrow [I - \eta \nabla_w T \nabla_w L(w_{t-1}, \lambda, B^{val})] \alpha$
            $\lambda \leftarrow \lambda + \eta p$
            $w_0 \leftarrow w_T$
        $\lambda \leftarrow \lambda_0 + \beta_\lambda(\lambda - \lambda_0)$
        $w \leftarrow w + \beta_w(w_0 - w')$
    return λ, w

---

In an embodiment, the second version also modified the dynamic of the internal loop and where $\beta_w$ and $\beta_\lambda$ are two parameters.

An embodiment is directed to reinforcement learning. For example, in an embodiment, the architecture is used in a Reinforcement Learning (RL) architecture where the previous experience is stored in a rolling memory storage and reused for the validation of the current performance and the training to the other, the neural network is used for the policy or the value function or both. In RL, the experience is generated while solving the current task. The Neural Network is used for storing the value of the Q-function and the policy, where the Q-function maps the (state, action) pair to the expected reward, while the policy map the (state, action) to a probability, i.e. the policy is a probability distribution. The states and actions that are seen by the agent and the respective output are the used to train the two networks. This information is stored (partially) to implement the continual learning among tasks. For example, the agent solves multiple video games, one after the other. In this context it may be undesirable to expose all experiences at the same time nor loose performance on previous games. And in particular embodiments seek to improve based on past experience.

Figure 6:
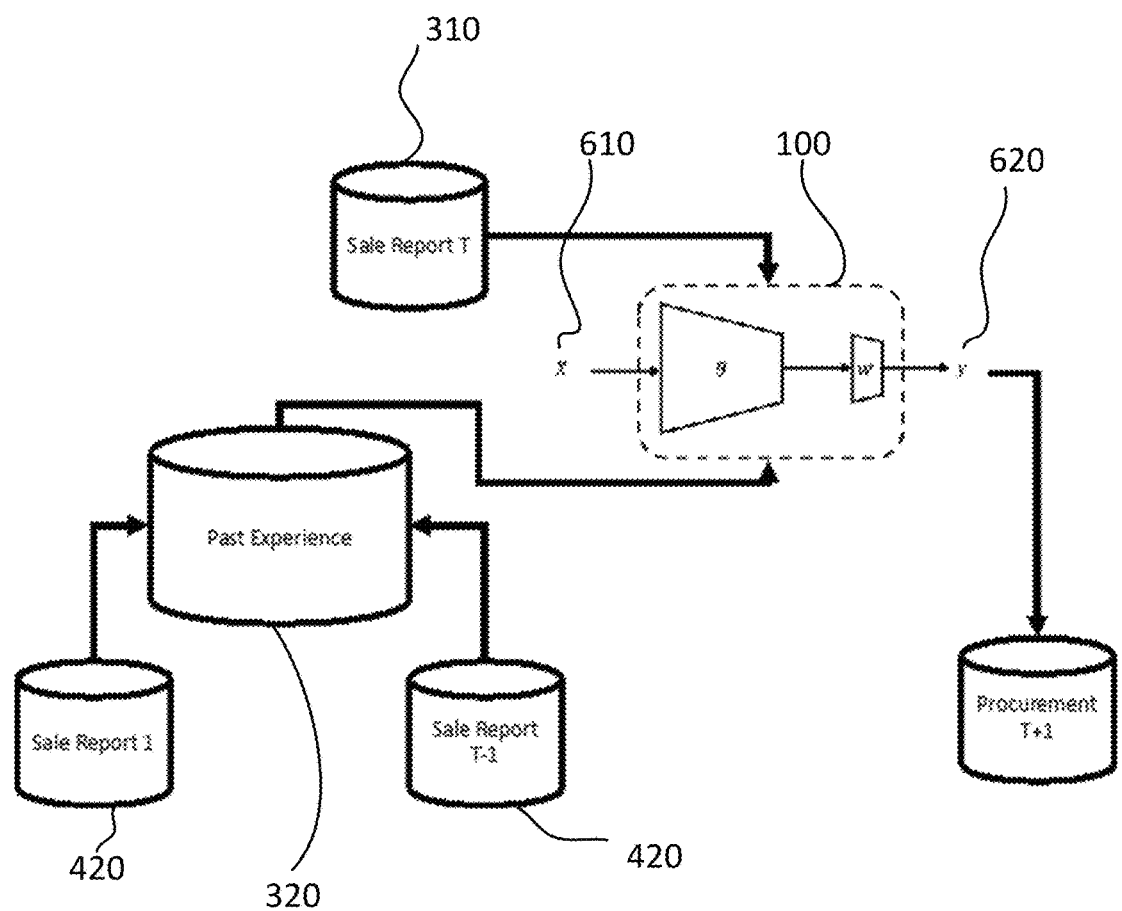
FIG. 6 illustrates retail procurement processing according to an embodiment.

Another embodiment is directed to retail demand prediction and automatic procurement. FIG. 6 illustrates an embodiment of retail procurement processing. In FIG. 6 the function y=f(X,θ,w) represents the prediction model used to predict the sales in the future period T+1 and on based on that the automatic procurement is performed.

An embodiment of a method of the present invention can be used for retail demand prediction. In this case, the data of products includes (e.g., consists of) sales per point of sale for each product. When a neural network is used to predict the sales, the approach can separate a part of the network as a common part that plays the role of a feature extractor, and the last layers as product-specific component (per selling point). The data, in this embodiment, is acquired continuously and the system is updated every time there is a new sale reported. This means that new products can appear, old products re-appear and some products are discarded. As the prediction model is updated on each product that is observed, performance is conditioned on the previous products such that the performance does not deteriorate.

Figure 7:
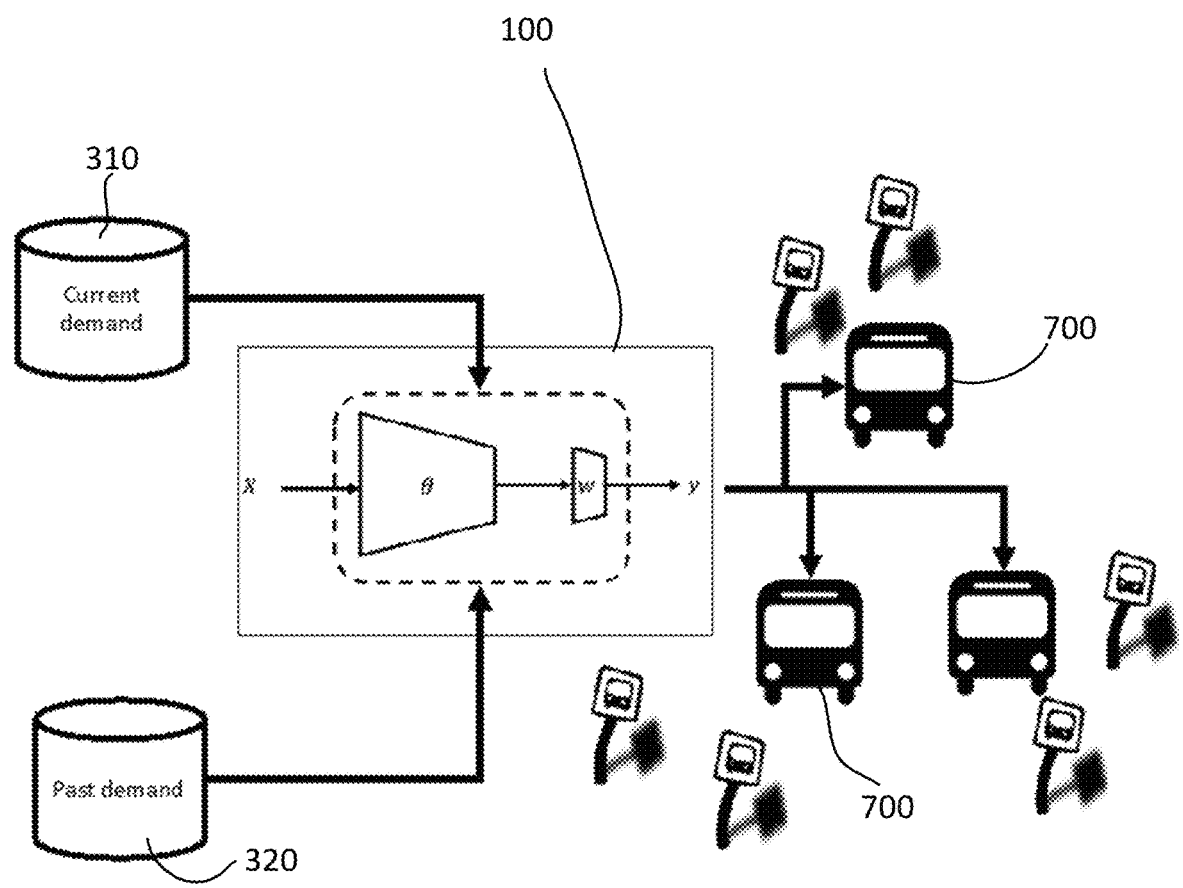
FIG. 7 illustrates an automatic transport service dispatching system according to an embodiment.

FIG. 7 illustrates an automatic transport service dispatching system. In FIG. 7 the function y=f(X,θ,w) represents the prediction model used to predict the transport demand in the future period T+1 and such that the automatic dispatching is performed.

An embodiment provides transport demand prediction and demand adaptive public transport. An embodiment is directed to where public transport vehicles can be dispatched based on demand of transport. Each vehicle has a pre-defined route and is dispatched in a specific time interval if the predicted demand justifies its deployment and if maximum delay is met. Each vehicle can be autonomous and configured to automatically route based on the prediction model.

An embodiment of the invention can be used for learning and assisting the dispatching system where the information of various lines that are being generated and update continuously. The prediction problem tackled by the system is solved by quickly adapting in the case of change in the data without forgetting the previously learned relationship.

A small portion of the past demand is stored in a memory buffer and is used to validate the prediction accuracy for the dispatching system using the bi-level framework, giving priority to the current task but still showing good performance for other station/route and days.

The demand prediction of a network composed of an embedding of the location of the station or the id of the station (hot encoding) and the current and past demand can be addressed by an embodiment of the present invention. As input also meta-information as day of the week, month and weather condition can be used. The output will be prediction of passenger at different instant in the future: 5, 10, 20, 30 minutes to 1 hour. This information is used to trigger the public transport vehicle start automatically.

Figure 8:
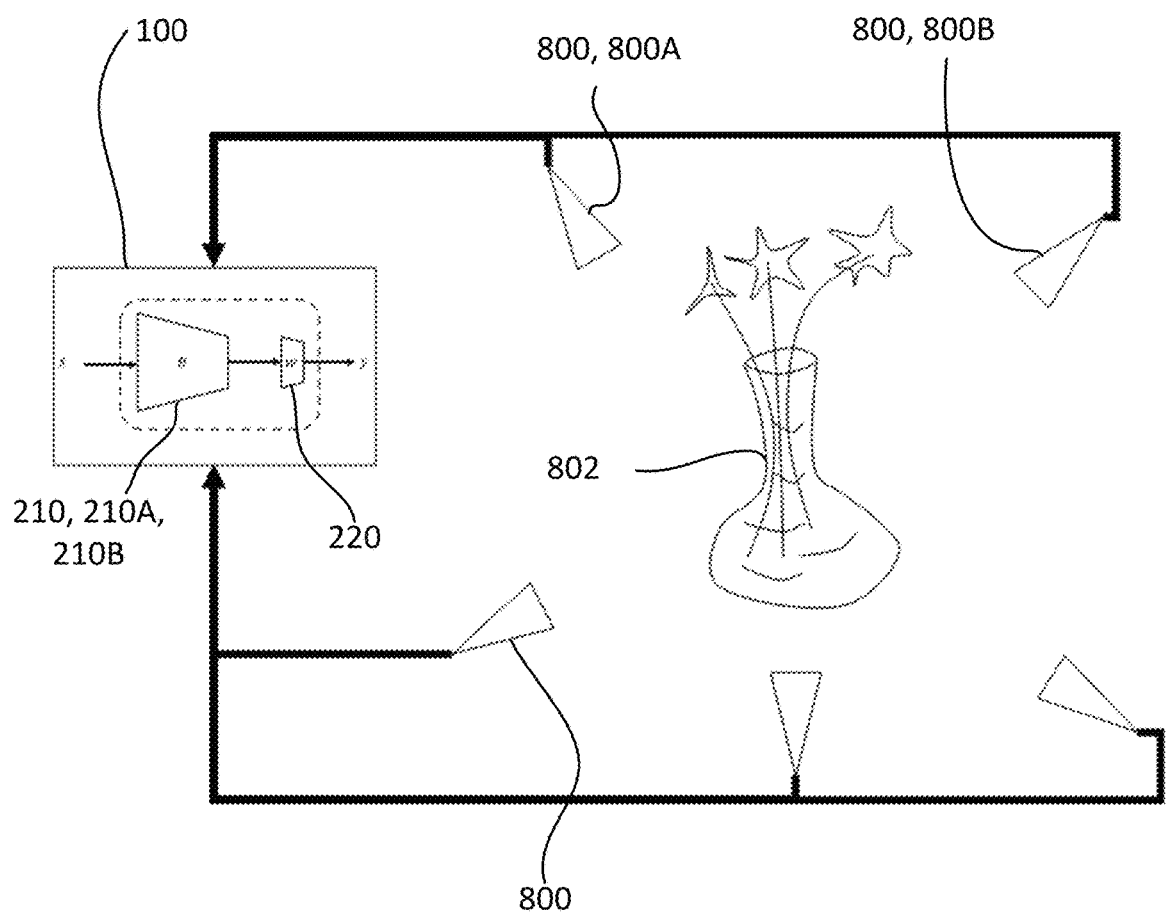
FIG. 8 illustrates tomography reconstruction according to an embodiment.

An embodiment is directed to video tomography data analysis (e.g., for digital health). FIG. 8 illustrates tomography reconstruction.

In this embodiment, the application of the continual learning is in the context of visual or tomography (volume) image processing. In this case the task is the single view angle. While moving around the target, the scanner send data to a processing unit which reconstructs the volumetric or the angular projection of the target. This information is constructed based on the current information but does not interfere with the previous collected data.

In this case the network maps the input image to the output volume reconstruction, where the input includes the image and the view point of the image collected. The output is the static tomography or volume reconstruction. Each task is the view on the target (e.g., a series of one or more images of a specific target).

Referring to FIG. 1, a neural network 100 can include an entry layer 110 (also called an "input layer"), multiple hidden layers 120, and an exit layer 130 (also called an "output layer"). Neural network 100 can be a recurrent neural network, a feed-forward neural network, etc. As further discussed below with reference to FIG. 9, a processing system can be configured to automatically perform each function disclosed herein including instantiation of neural network 100 by, for example, computing the layers in series.

Each layer can be formed from one or more nodes. For example, the entry layer can include entry nodes, each hidden layer can include respective hidden nodes, and the exit layer can include exit nodes. Each node can be structured as a neuron including, for example, a weighted receptive field and a non-linear activation function. Some nodes (e.g., input layer nodes) may have activation functions. Each activation function can include a bias. Examples of activation functions include ReLU activation functions and Sigmoid activation functions. The exit nodes can include a normalized activation function (e.g., a softmax activation function).

Referring to FIG. 1, neural network 100 can process source data X (i.e., an input) to return a classification y. Although classification y can be a prediction, it can have any suitable form (e.g., a bounding box, a route for a vehicle, etc.). In the embodiment of FIG. 1, neural network 100 is illustrated as being feed-forward, meaning that data flows downstream from entry layer 110, through hidden layers 120, to exit layer 130. As described above, other embodiments of neural network 100 can be recurrent as an example.

Neural network 100 can be divided into a first component 210 (also labeled θ in FIG. 1) and a second component 220 (also labeled w in FIG. 1). In the embodiment of FIG. 1, first component 210 includes entry layer 110 and one or more (e.g., all) hidden layers 120. Second component 220 includes (e.g., consists of) exit layer 130.

In an embodiment, first component 210 includes entry layer 110 and every hidden layer 120 while second component 220 consists of exit layer 130. In an embodiment, first component 210 includes entry layer 110 and one or more hidden layers 120 while second component 220 includes exit layer 130 and one or more hidden layers 120. In an embodiment, first component 210 includes entry layer 110, one or more hidden layers 120, and exit layer 130 while second component 220 includes one or more hidden layers 120. Therefore, while the FIGS. illustrate second component 220 as being downstream of first component 210, such a disposition is only exemplary. Second component 220 can be intermediate first component 210 or vice-versa. Second component 220 can be upstream of first component 210.

In an embodiment, trainable parameters of neural network 100 can include, for each node of a layer, a weighted receptive field and/or a bias. Therefore, the trainable parameters for first component 210 (also called "first parameters") can include the weighted receptive field and/or bias for at least some (e.g., all) nodes contained therein. Similarly, the trainable parameters for second component 220 (also called "second parameters") can include the weighted receptive field and/or bias for at least some (e.g., all) nodes contained therein. In an embodiment, the first parameters are the base-parameters and the second parameters are the hyper-parameters. In an embodiment, the first parameters are the hyper-parameters and the second parameters are the base-parameters.

Training can include applying an algorithm (e.g., a stochastic gradient descent algorithm) to minimize an error (also called "cost") function. In a supervised learning embodiment, the cost function can index the difference (e.g., error) between a measured output (also called a "measured classification") and a desired output (also called a "desired classification") associated with a known input (also called known "source data"). Two cost functions can be applied: a first cost function for training the first parameters; and a second cost function for training the second parameters.

Referring to FIG. 3, first component 210 and second component 220 can train over different data sets. In some embodiments, the first parameters can be trained with the common data and the second parameters can be trained with data specific to the new group. In either case, the training can be performed by defining the problem as bi-level problem and using a bi-level optimization solver. An exemplary bi-level problem is defined with cost functions such that the optimization learns new tasks while retaining the performance of previous ones.

In an embodiment, the first parameters (i.e., first component 210) are trained with (i.e., based on) only first training data 310 while the second parameters are trained with (i.e., based on) first training data 310 and second training data 320. Referring to FIG. 4, first training data 310 can be specific to a new group of one or more new tasks 410. Second training data 320 can be specific to an existing group of one or more existing tasks 420. By training on first and second training data 310, 320, second component 220 can be trained on data common to all tasks. Therefore, referring to FIG. 3, the arrow extending from second training data 320 to first component 210 can be omitted. Alternatively, and for reasons discussed above, the arrow extending from second training data 320 to first component 210 can be present while the arrow extending from second training data 320 to second component 220 can be absent. In an embodiment, the first parameters are one of the base-parameters and the hyper-parameters and the second parameters are the other of the base-parameters and the hyper-parameters.

Referring to FIG. 2, first component 210 can trained on the common data while each second component 220 can be trained on a unique set of first training data (i.e., task-specific training data). For example, second component 220A can be trained only on first training data specific to task "A" (e.g., night time driving) while second component 220B can be trained only on first training data specific to task "B" (e.g., day time driving). First component 210 can be trained on common data (e.g., data based on both task "A" and task "B"). During use, the processing system can be configured to automatically select and apply the appropriate second component 220. For example, based on detecting the presence of night time, the processing system can apply second component 220A while based on detecting the presence of day time, the processing system can apply second component 220B. Thus, the processing system can dynamically switch between second components based on sensed conditions (e.g., temperature, light, speed, etc.).

Referring to FIG. 5, first training data 310 can be specific to a current (e.g., new) task 410 while second training data 320 can be specific to group of previous tasks 420. Neural network 100 can be trained based on first training data 310 and second training data 320. For example, one of first component 210 and second component 220 (not shown in FIG. 5) can be trained based on only the first training data 310 while the other of first component 210 and second component 220 (not shown in FIG. 5) can be trained based on only the second training data 320 (e.g., when training occurs before database marked "past experience" in FIG. 5 is updated based on first training data 310) or a combination of the first and second training data 310, 320 (e.g., when training of occurs after database marked "past experience" in FIG. 5 is updated based on first training data 310).

Referring to FIG. 6, the processing system can automatically produce a classification 620 (also labeled "y") based on source data 610 (also labeled "X") with neural network 100. First training data 310 for neural network 100 can be based, for example, on sales reports generated at time T, but not earlier. Second training data 320 for neural network 100 can be based on. for example, sales reports generated from time 1 to time T−1. Classification 620 can predict a sales report at time T+1 and thus be used for the purposes of procurement.

Referring to FIG. 7, neural network 100 can produce a classification y based on source data X. One or more vehicles 700 (e.g., cars, planes, buses) can each include a processing system configured to automatically control a motor of the respective vehicle 700 based on the classification y. First training data 310 can be based on current vehicle demand (e.g., electronic pickup requests sent by mobile devices to a processing system configured to instantiate neural network 100 over a predetermined current time period, such as the last five minutes), but not historical vehicle demand (e.g., vehicle demand occurring before the predetermined current time period). Second training data 320 can be based on historical vehicle demand, but not current vehicle demand.

Referring to FIG. 8, a plurality of sensors 800 (e.g., cameras) can be configured to measure (e.g., capture images of) an object 802. Each sensor 800 can represent a respective task. Neural network 100 can be configured to generate a classification y representing a static tomography or volume reconstruction of object 802 based on a captured image. First training data 310 can be based on a subset of sensors 800 (e.g., only first sensor 800A). Second training data 320 can be based on all sensors 800. A respective first component 210 can be trained for each sensor 800 while sensors 800 can share a common second component 220. For example, first component 210A can be trained based on only first sensor 800A, while first component 210B can be trained based on only second sensor 800B. When using neural network 100 to classify source data X, the processing system can select and apply one of the multiple first components 210 based on the source data X (e.g., based on metadata encoded therein). For example, if the source data X was captured with first sensor 800A, then the processing system can select and apply first component 210A, etc.

Figure 14:
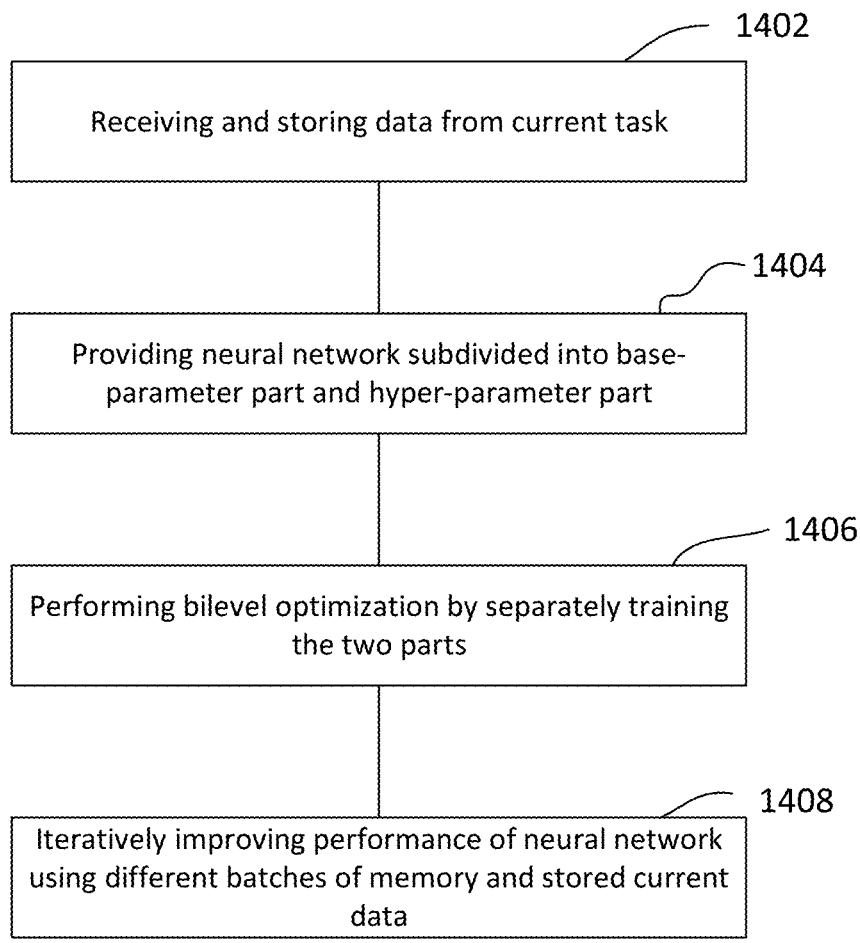
FIG. 14 presents a block diagram of a method of continual learning in an artificial intelligence system through bi-level optimization according to an embodiment.

FIG. 14 presents a block diagram of a method of continual learning in an artificial intelligence system through bi-level optimization. At block 1402, the method can include receiving data (e.g., training data) from a current task (e.g., a new task) and storing the received data for later use. At block 1404, the method can include providing a neural network subdivided into two parts including a parameter part (also referred to herein at different locations as a base-parameter part) and a hyper-parameter part. At block 1406, the method can include performing bi-level optimization by separately training the two parts of the neural network, once conditioned to the performance of all stored samples of previous tasks (e.g., after the neural network has been trained on the stored samples of all previous tasks).

At block 1408, the method can include: after performing the bi-level optimization, iteratively batch training the neural network based on batches of data collectively comprising: (i) at least some of the previous task data samples and (ii) the stored current task data sample. Each batch can include a respective task data sample. Thus, the iteratively batch training is an external loop to the bi-level optimization. Preferably, for enhanced performance, the bi-level optimization can be done at the level of the single batch. For example, a first batch can include the stored current task data sample, a second batch can include a stored data sample of a first previous task, a third batch can include a stored data sample of a second previous task, etc. According to an embodiment, a batch can be a subset of the input data including data from a current task and/or other tasks, and a sum of the batches provides the full dataset.

Block 1406 can include iteratively training the base-parameter part of the neural network with a first data set and a first cost function; and iteratively training the hyper-parameter part of the neural network with a different second data set and a different second cost function. In an embodiment, the base-parameter part of the neural network is iteratively trained with data specific to a subset of a group of multiple tasks while the hyper-parameter part of the neural network is iteratively trained with validation data common to each of the multiple tasks.

Block 1406 can include defining the training of the two parts of the neural network as a bi-level problem and applying a bi-level optimization solver. In an embodiment, the bi-level problem is defined with respect to the first and second cost functions such that the optimization resulting from the bi-level optimization solver causes the base-parameter part of the neural network to learn one or more new tasks while the hyper-parameter part of the neural network retains performance for previously learned tasks.

Figure 9:
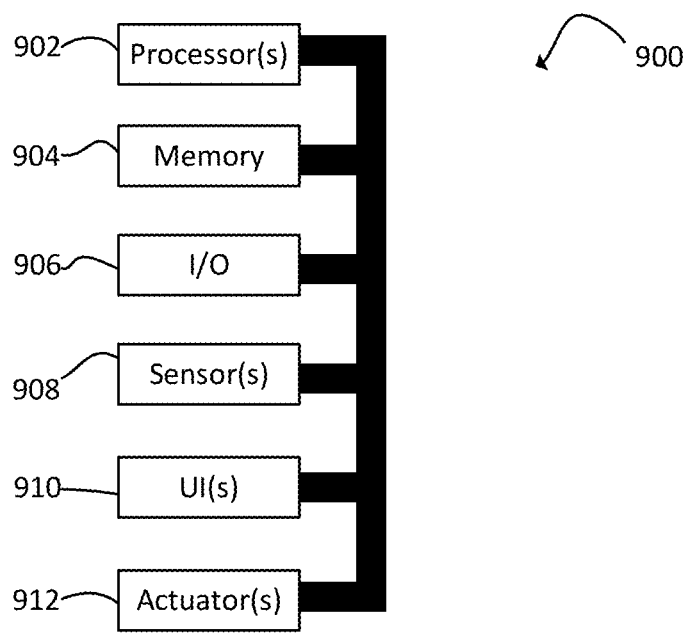
FIG. 9 is a block diagram of a processing system according to an embodiment.

Referring to FIG. 9, a processing system 900 can include one or more processors 902, memory 904, one or more input/output devices 906, one or more sensors 908, one or more user interfaces 910, and one or more actuators 912. Processing system 900 can be representative of each computing system disclosed herein.

Processors 902 can include one or more distinct processors, each having one or more cores. Each of the distinct processors can have the same or different structure. Processors 902 can include one or more central processing units (CPUs), one or more graphics processing units (GPUs), circuitry (e.g., application specific integrated circuits (ASICs)), digital signal processors (DSPs), and the like. Processors 902 can be mounted on a common substrate or to different substrates.

Processors 902 are configured to perform a certain function, method, or operation (e.g., are configured to provide for performance of a function, method, or operation) at least when one of the one or more of the distinct processors is capable of executing code (e.g., interpreting scripts), stored on memory 904 embodying the function, method, or operation. Processors 902, and thus processing system 900, can be configured to perform, automatically, any and all functions, methods, and operations disclosed herein. Therefore, processing system 900 can be used to implement the protocols, devices, mechanisms, systems, and methods described above.

For example, when the present disclosure states that processing system 900 performs/can perform task "X" (or that task "X" is performed), such a statement should be understood to disclose that processing system 900 can be configured to perform task "X". Processing system 900 is configured to perform a function, method, or operation at least when processors 902 are configured to do the same.

Memory 904 can include volatile memory, non-volatile memory, and any other medium capable of storing data. Each of the volatile memory, non-volatile memory, and any other type of memory can include multiple different memory devices, located at multiple distinct locations and each having a different structure. Memory 904 can include cloud storage.

Examples of memory 904 include a non-transitory computer-readable media such as RAM, ROM, flash memory, EEPROM, any kind of optical storage disk such as a DVD, a Blu-Ray® disc, magnetic storage, holographic storage, an HDD, an SSD, any medium that can be used to store program code in the form of instructions or data structures, and the like. Any and all of the methods, functions, and operations described in the present application can be fully embodied in the form of tangible and/or non-transitory machine-readable code (e.g., interpretable scripts) saved in memory 904.

Input-output devices 906 can include any component for trafficking data such as ports, antennas (i.e., transceivers), printed conductive paths, and the like. Input-output devices 906 can enable wired communication via USB®, DisplayPort®, HDMI®, Ethernet, and the like. Input-output devices 906 can enable electronic, optical, magnetic, and holographic, communication with suitable memory 906. Input-output devices 906 can enable wireless communication via WiFi®, Bluetooth®, cellular (e.g., LTE®, CDMA®, GSM®, WiMax®, NFC®), GPS, and the like. Input-output devices 906 can include wired and/or wireless communication pathways.

Sensors 908 can capture physical measurements of environment and report the same to processors 902. User interface 910 can include displays, physical buttons, speakers, microphones, keyboards, and the like. Actuators 912 can enable processors 902 to control mechanical forces.

Processing system 900 can be distributed. Processing system 900 can have a modular design where certain features have a plurality of the aspects shown in FIG. 9. For example, I/O modules can include volatile memory and one or more processors. As another example, individual processor modules can include read-only-memory and/or local caches.

Embodiments of the invention are further described below.

Continual Learning addresses the problem of learn parameters for new tasks, while reducing the performance of previous trained tasks and, at the same time, transferring information forward from old tasks to the current learned tasks. An embodiment presents an approach to continual learning for supervised learning called Bi-level Continual Learning (BiCL) that provides high performances for the current task while reducing the effect of catastrophic forgetting. The ability to retain acquired knowledge and use it for future tasks improves Artificial Intelligence systems such as neural networks instantiated across a processing system.

Lifelong learning assumes that experience is continuous and hardly replicable. Continuous transfer of information from old experience to new tasks and from new tasks to old tasks is thus important. Though, the learning capability of AI systems are limited, in size, i.e. memory, or time, i.e. computation. Distillation of information and dreaming are common approaches to extract knowledge and make available for future and past tasks.

Embodiments model continual learning as bi-level optimization problem. In an embodiment, bi-level optimization formulation models the optimal training of the current task as an inner problem, conditional to hyper-parameter choice. The hyper-parameters are selected such that the overall model performs well on current and past validation set. Hyper-parameters can be used to model different aspects, for example to select the network architecture such that the learning of the current task and the performance on the old tasks is maximized. Embodiments explore the impact of splitting the network in two parts. One part that is the devoted to learning the current task (e.g., a new task) and another part is seen as hyper-parameter and addresses the performance on all tasks.

With respect to continual learning, embodiments address positive transfer learning and avoiding negative transfer learning among tasks. In other words, embodiments improve the learning ability when presented new tasks, without reducing, if not improving, the performance on old tasks. Embodiments define the continual learning problem as the task to minimize a predefined loss function L on the set of parameters θ and a dataset D={(x, y)}, where x are the input features and y is the task output. For every sample pair $(x_i, y_i) \sim D$ and $(x_j, y_j) \sim D$, a positive transfer of information happens if:

$$\nabla_\theta L(x_i, y_i)^T \nabla_\theta L(x_j, y_j) > 0$$

while negative transfer of information or interference happens when the inner product is negative. A way to achieve positive learning transfer is to optimize the modified loss function:

$$\min_\theta E_{(x_i, y_i), (x_j, y_j) \sim D \times D} \{L(x_i, y_i) + L(x_j, y_j) - \alpha \nabla_\theta L(x_i, y_i)^T \nabla_\theta L(x_j, y_j)\}$$

Bi-level problems arise when one or more variables of a minimization problem depend on the solution of a secondary minimization problem, where the cost function (or the constraints) depends on the main variable. The two problems are also called outer and inner problems. In an embodiment, a principle is that the solution of the outer problem depends on the solution on the inner problem, where the decision is taken by the master (outer level) and the follower (inner level) acts upon the value defined by the master. In machine learning problem, the optimization problem can be described in statistical form. Mathematically the bi-level problem can be described as:

$$\min_\lambda F(\lambda) = E_{s \sim S}\{f(w_{\lambda, s}, \lambda, s)\}$$
$$\text{s.t. } w_{\lambda, s} = \arg\min_w E_{b \sim B(s)}\{g(w, \lambda, b)\}$$

where $s \sim S$ represents some context described as random variable, $b \sim B(s)$ some conditional distribution, $\lambda \in R^n$ are the hyper-parameters and $w \in R^m$ are the parameters of the model. The sub problem can be solved through gradient descendant method (e.g., stochastic gradient descent)

In hyper-parameter optimization, an objective of an embodiment is to find the optimal hyper-parameters λ of some algorithm or network structure that minimizes the error on some data sets. When the number of parameters grows and cost function is differentiable in the hyper-parameters, alternative approaches to grid search are desirable to lower the complexity of computation.

Multi-task learning and few-shot learning are examples of Meta-learning, where some hyper-parameter λ of an algorithm $A_\lambda$ is optimized with respect to some performance test $E_{t \sim T}\{c_t\}$ over a set of tasks $t \sim T$. For example, the outer level loss can be the average error on the validation dataset and minimized over the hyper-parameters common to all tasks, while the inner loss can be the average of the error of the single model:

$$\min_{\lambda} F(\lambda) = E_{(x,y,t) \sim D^{val}} \{f(w_{t,\lambda}, x, y, \lambda)\}$$

$$\text{s.t.} \quad w_{t,\lambda} = \arg\min_{w_t} E_{(x,y,t) \sim D_t^{tr}} \{g(w_t, x, y, \lambda)\}$$

where $D^{val} = \cup_{t=1}^T D_t^{val}$ and $D^{tr} = \cup_{t=1}^T D_t^{tr}$ and $D_t^{val}$, $D_t^{tr}$ are the validation and training datasets for task t. Two example choices for predictive model for the single task are $$y(x|w_t, \lambda) = w_t^T h_{80}(x), \text{ or}$$

$$y(x|w_t, \lambda) = (\lambda + w_t)^T x$$

The above mathematical description of the bi-level problem can be solved iteratively, where the sub-problem is considered a dynamic system, whose initial condition is $\Theta_0(\lambda)$ at $k=0$ and $$w_{k+1} = \Theta_{k+1}(w_k, \lambda)$$

and whose final value after K iteration is $w_K = w_{\lambda,s}^*$ is the approximated optimal solution to the sub-problem. When using stochastic gradient descendant (SGD), the dynamic can be defined as:

$$w_{k+1} = w_k - \gamma_k(\lambda) \nabla_w g(w_k, \lambda)$$

where $\gamma_k(\lambda)$ is the step size. An embodiment computes the hyper-gradient of the primal problem but differentiates the cost function with respect to the hyper-parameters $\lambda$:

$$d_\lambda f(w, \lambda) = \nabla_\lambda f(w, \lambda) + \sum_{k=0}^K B_k A_{k+1} \ldots A_K \nabla_w f(w, \lambda)$$

where $A_{k+1} = \Theta_{k+1}(w_k, \lambda)$, $B_{k+1} = \Theta_{k+1}(w_k, \lambda)$ for $k>0$ and $B_0 = d_\lambda \Theta_0(\lambda)$, and where $d_x$ is the total derivative with respect to variable x, while $\nabla_x$ is its partial derivative.

When reptile dynamics are substituted into the inner problem, into the dynamic function $\Theta_k(w_k, \lambda)$, the secondary problem becomes resilient to time-varing distribution given a specific context s, (e.g. a specific task):

$$w_{k+1} = w_k + \beta_k(\lambda)(SGD^r(w_k, \lambda, s) - w_k)$$

with r the number of steps. Whereas if the reptile update is considered at the level of the hyper-gradient $d_\lambda f$ (i.e. outer problem), the solution will be resilient to changes across the contexts e.g. tasks). When applied to both levels, the reptile cost function solves the following bi-level problem:

$$\min_{\lambda} F(\lambda) = E_{s,s' \sim S \times S}$$

$$\{f(w_{\lambda,s}, \lambda, s) + f(w_{\lambda,s'}, \lambda, s') - \alpha_f d_\lambda f(w_{\lambda,s}, \lambda, s)^T d_\lambda f(w_{\lambda,s'}, \lambda, s')\}$$

$$\text{s.t.} \quad w_{\lambda,s} = \arg\min_{w} E_{b,b' \sim B(s) \times B(s')}$$

$$\{g(w, \lambda, b) g(w, \lambda, b') - \alpha_g \nabla_w g(w, \lambda, b)^T \nabla_w g(w, \lambda, b')\}$$

where $w_{\lambda,s'}$ is derived similarly to $w_{\lambda,s}$, but on a different context. Alg. 2 describes the algorithm that implements an approximation the above bi-level problem:

| Algorithm 2 ReptileReverseHG |
|---|
| 1: procedure REPTILEREVERSEHG($\lambda$, w, D, K, b, s) |
| 2:    while $B^{tr}, B^{val}$ = Batch(D) do |

| Algorithm 2 ReptileReverseHG |
|---|
| 3:      w' ← w |
| 4:      $\lambda'$ ← $\lambda$ |
| 5:      for $\forall i = 1 \ldots b$ do |
| 6:          $B_i^{tr}, B_i^{val}$ = Sample($B^{tr}, B^{val}$, s) |
| 7:          $w_0$ ← w |
| 8:          $\lambda_0$ ← $\lambda$ |
| 9:          for $k = 1 \ldots K$ do |
| 10:           Apply r iteration of SGD |
| 11:           $w_k$ ← $w_{k-1}$ + $\beta_w$(SGD$^r(w_{k-1}, \lambda, B_i^{tr})$ − $w_{k-1}$) |
| 12:          $\alpha$ ← $\nabla_w L(w_T, \lambda, B_i^{val})$ |
| 13:          $\alpha$ ← $\nabla_\lambda L(w_T, \lambda, B_i^{val})$ |
| 14:          for $k = K, \ldots, 1$ do |
| 15:           p ← p − $\eta \nabla_\lambda^T \nabla_w L(w_{k-1}, \lambda, B_i^{tr}) \alpha$ |
| 16:           $\alpha$ ← $[I - \eta \nabla_w^T \nabla_w L(w_{k-1}, \lambda, B_i^{tr})] \alpha$ |
| 17:          $\lambda$ ← $\lambda$ + $\eta p$ |
| 18:          w ← $w_K$ |
| 19:      $\lambda$ ← $\lambda'$ + $\beta_\lambda(\lambda - \lambda')$ |
| 20:      w ← w' + $\beta_w$(w − w') |
|      return $\lambda$, w |

The loss function of the outer problem of the above bi-level problem can be approximated by performing the Reptile gradient step on the hyper-gradient $d_\lambda f(w_{\lambda,s}, \lambda, s)$.

In a continual learning embodiment, the network parameters are updated according to the current task data, but they still perform well with previous tasks, and possible accuracy improves. Similar to Meta-learning, an embodiment can identify parameters that are common to all tasks (hyper-parameters $\lambda$) and parameters that are specific to each task ($w_t$). Given the current task's dataset $D_t = \{D_t^{tr}, D_t^{val}\}$, embodiments can keep two datasets $M = \{M^{tr}, M^{val}\}$, the episodic memory, where the embodiments can store previous tasks' samples. In a strict online setting (in an embodiment, current task's samples are seen only once) it will also include current task samples.

$$\min_{\lambda} E_{(x,y,t),(x',y',t') \sim M^{val} \cup D_t^{val}} \quad \text{(Eq. A, part 1)}$$

$$\{L(w_{\lambda,t}, \lambda, x, y) + L(w_{\lambda,t'}, \lambda, x', y') - \alpha d_\lambda L(x_i, y_i)^T d_\lambda L(x_j, y_j)\}$$

$$\text{s.t.} \quad w_{\lambda,t} = \arg\min_{w_t} E_{(x,y,t) \sim M^{tr} \cup D_t^{tr}} \{L(w_t, \lambda, x, y)\} \quad \text{(Eq. A, part 2)}$$

Disclosed is the following algorithm:

| Algorithm 1 Bi-Level Continual Learning |
|---|
| 1: procedure BICL($\{D_1, \ldots, D_T\}$) |
| 2:    Initialization of network parameters and |
| 3:    hyper-parameters |
| 4:    $\lambda$, w, M ← Init( ), Init( ), { } |
| 5:    for $t = 1 \ldots T$ do |
| 6:      $w'_0, \lambda'_0$ ← w, $\lambda$ |
| 7:      for $B^{tr}, B^{val}$ ← Continuum ($D_t$) do |
| 8:         $w_0, \lambda_0$ ← w, $\lambda$ |
| 9:         $B_1^{tr}, \ldots, B_b^{tr}$ ← Sample($B^{tr}$, M) |
| 10:        $B_1^{val}, \ldots, B_b^{val}$ ← Sample($B^{val}$, M) |
| 11:        for $i = 1 \ldots b$ do |
| 12:          Apply K iteration of ADAM |
| 13:          for $k = 1$ ← K do |
| 14:           $w_k$ ← ADAM($w_{k-1}, \lambda, B_i^{tr}$) |
| 15:         $\alpha$ ← $\nabla_w L(w_K, \lambda, B_i^{val})$ |
| 16:         p ← $\nabla_\lambda L(w_K, \lambda, B_i^{val})$ |
| 17:         for $k = K \ldots 1$ do |
| 18:          p ← p − $\eta \nabla_\lambda \nabla_w L(w_{k-1}, \lambda, B_i^{tr}) \alpha$ |
| 19:          $\alpha$ ← $[I - \eta \nabla_w \nabla_w L(w_{k-1}, \lambda, B_i^{tr})] \alpha$ |

-continued

| Algorithm 1 Bi-Level Continual Learning |  |
|---|---|
| 20: | $\lambda \leftarrow \lambda + \eta p$ |
| 21: | reptile at batch level |
| 22: | $\lambda \leftarrow \lambda_0 + \beta_\lambda(\lambda - \lambda_0)$ |
| 23: | $w \leftarrow w_0 + \beta_w(w - w_0)$ |
| 24: | $M \leftarrow$ update − mem($M, B^{tr}, B^{val}$) |
| 25: | reptile at task level |
| 26: | $\lambda \leftarrow \lambda'_0 + \beta'_\lambda(\lambda - \lambda'_0)$ |
| 27: | $w \leftarrow w'_0 + \beta'_w(w - w'_0)$ |
|  | return $\lambda, w$ |

The episodic memory M can be defined using Reservoir sampling (Vitter 1985), but K-center clustering as proposed in can also be used.

Figure 10:
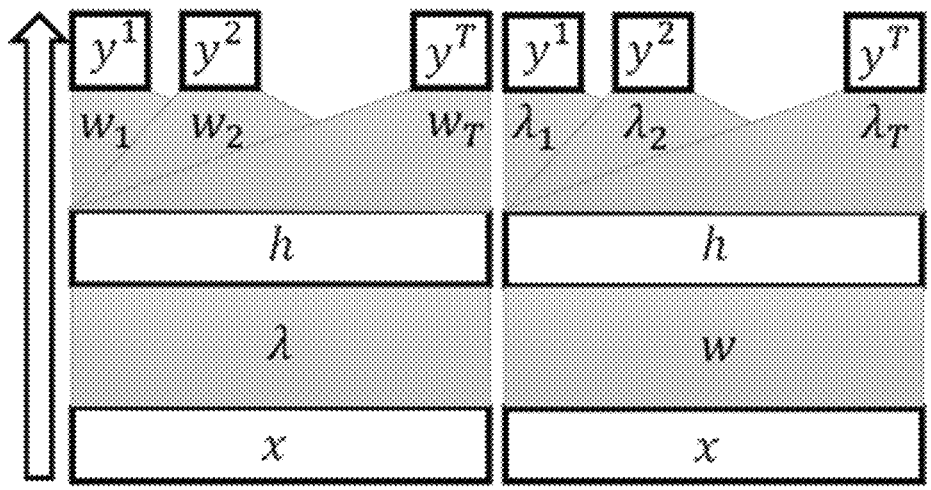
FIG. 10 shows BiCL continual learning discriminative models (multi-head) according to an embodiment.
Figure 11:
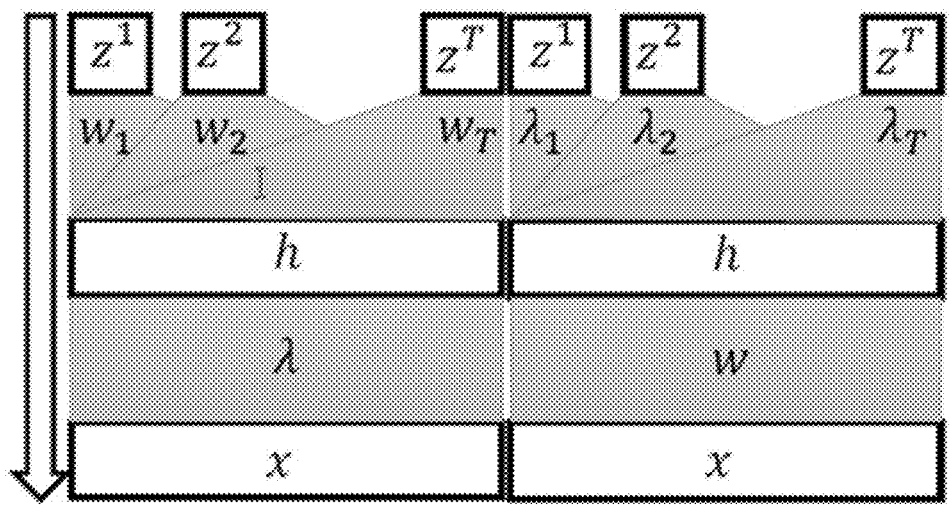
FIG. 11 shows BiCL continual learning generative models (multi-head) according to an embodiment.
Figure 12:
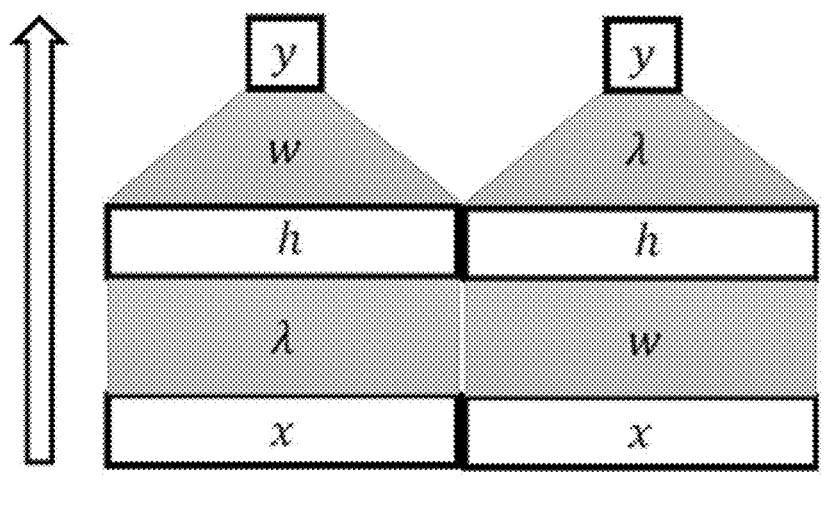
FIG. 12 shows BiCL continual learning discriminative models (single head) according to an embodiment.
Figure 13:
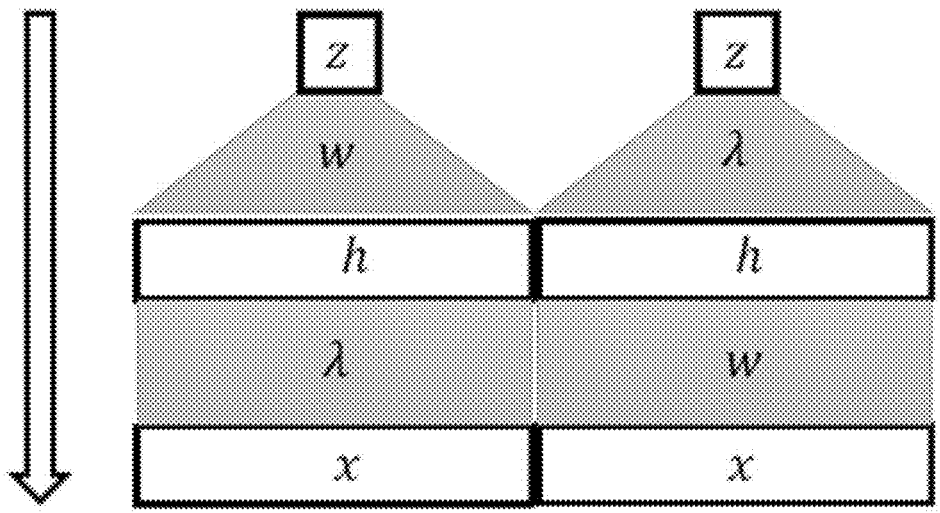
FIG. 13 shows BiCL continual learning generative models (single head) according to an embodiment.

FIG. 10 and FIG. 11 show how the hyper parameters and parameters can be defined for multi-head discriminative and generative neural networks, where the arrow indicates the direction of the use of the network. For example in the generative network, $x \in R^n$ is generated by sampling $z_t \sim N(\mu_{t,m}, \text{diag}(\sigma_{t,m}))$ with m, n the input and output sizes and $\mu_{t,m}, \sigma_{t,m}$ are vectors with the mean and standard deviation of the latent vector $z_t$. Similar network in the case of single head are defined, where $z = z_t$, $\forall t$ or $y_t = y$, $\forall t$.

In an embodiment, a variational auto-encoder (VAE) uses a categorical loss function on the reconstructed input data and a latent variable loss in the form of the KL divergence to the unit variance and zero mean normal distribution.

$$L_{VAE}(\theta, \phi, x^i) = E_{q_\phi(z^i|x^i)}\left(\log \frac{p(x^i|z^i, \theta)p(z^i)}{q_\phi(z^i|x^i)}\right)$$

In BiCL, an embodiment can define $\theta = (\lambda_g, w_g)$, the set of generative variables of the generative model $G_\theta(z)$ that maps the latent variable $z^i$ into the generated sample $x^i$, while $\phi = (\lambda_e, w_e)$ that are the variable of the encoder. The encoder $E_{99}(x)$ maps the input data x into the latent variance $\sigma_m$ and mean $\mu_m$. The Generative Bi-level Continual Learning Optimization problem becomes:

$$\min_\lambda E_{(x,t),(x',t') \sim M^{val} \cup D_t^{val}}$$
$$\{L(w_{\lambda,t}, \lambda, x) + L(w_{\lambda,t'}, \lambda, x') - \alpha d_\lambda L(x_i)^T d_\lambda L(x_j)\}$$
$$\text{s.t. } w_{\lambda,t} = \text{argmin}_{w_t} W_{(x,t) \sim M^{tr} \cup D_t^{tr}}\{L(w_t, \lambda, x)\}$$

where now $\lambda = (\lambda_g, \lambda_e)$ and $w = (w_g, w_e)$ and the episodic memory is either sample from the actual datasets or generated from the previous network, i.e. $M = \{x|x = G_{\hat\theta}(z), z \sim N(0, I_m)\}$ or $M = \{x|x \sim p(x|z, \hat\theta)p(z)\}$, where $\hat\theta = (\hat\lambda_g, \hat w_g)$ are the parameters and hyper-parameters of the previous step.

For the categorical discriminative model, an embodiment uses softmax cross entropy on the single class probability datasets including Permuted MNIST, Rotation MNIST, Many Permuted MNIST, OMNIGLOT. Experiment Settings include Baselines, Online, Independent Task, GEM, and MER. The results are presented in Table 1, above.

In an embodiment, the basic shape of the hyper-gradient is $$d_\lambda f(w_\lambda, \lambda) = \nabla_\lambda f(w_\lambda, \lambda) + \nabla_\lambda w_\lambda \nabla_w f(w_\lambda, \lambda)$$

where the total derivative of the cost out function, where derivative of optimal solution $w_\lambda$ derivative is given by:

$$\nabla_\lambda w_\lambda = \sum_{k=0}^T B_k A_{k+1} \ldots A_T$$

When an embodiment considers $g(\lambda) = f(w_\lambda, \lambda)$, the reptile step is given:

$$\lambda_1 = \lambda_0 - \alpha d_\lambda g_0(\lambda_0)$$
$$\lambda_2 = \lambda_1 - \alpha d_\lambda g_1(\lambda_1)$$
$$d_\lambda g_1(\lambda_1) =$$
$$d_\lambda g_1(\lambda_0) + d_\lambda^2 g_1(\lambda_0)(\lambda_1 - \lambda_0) = d_\lambda g_1(\lambda_0) - \alpha d_\lambda^2 g_1(\lambda_0)d_\lambda g_0(\lambda_0)$$
$$p_{reptile} = \frac{(\lambda_0 - \lambda_2)}{\alpha} =$$
$$d_\lambda g_0(\lambda_0) + d_\lambda g_1(\lambda_1) = d_\lambda g_0(\lambda_0) + d_\lambda g_1(\lambda_0) - \alpha d_\lambda^2 g_1(\lambda_0)d_\lambda g_0(\lambda_0)$$

where $g_i(\lambda)$ is the gradient of the hyper-parameter evaluated on the i-batch. This can be equivalent to minimize in the outer objective in Eq. A, when $g_i(\lambda) = E_{b \sim B_i} L(w_\lambda, \lambda, b)$ and $b = (x, y, t)$, since:

$$\mathbb{E}\{p_{reptile}\} = \mathbb{E}\{d_\lambda g_0(\lambda_0)\} + \mathbb{E}\{d_\lambda g_1(\lambda_0)\} - \alpha \mathbb{E}\{d_\lambda^2 g_1(\lambda_0)d_\lambda g_0(\lambda_0)\} =$$
$$\mathbb{E}\{d_\lambda g_0(\lambda_0)\} + \mathbb{E}\{d_\lambda g_1(\lambda_0)\} - \alpha \mathbb{E}\{d_\lambda(d_\lambda g_1(\lambda_0)^T d_\lambda g_0(\lambda_0)\}$$

where the last line is the gradient in the direction of the inner product of the two directions.

In an embodiment, Reptile step as system dynamic for the inner loop of bi-level Optimization can be expressed as:

$$m_{t+1} = \beta_1 m_t + (1 - \beta_1)\frac{\partial}{\partial w}L_t(w_t)$$
$$v_{t+1} = \beta_2 v_t + (1 - \beta_2)\left(\frac{\partial}{\partial w}L_t(w_t)\right)^2$$
$$\hat m_{t+1} = \frac{m_{t+1}}{1 - \beta_1^t}, \hat v_{t+1} = \frac{v_{t+1}}{1 - \beta_1^t}$$
$$w_{t+1} = w_t - \eta\frac{\hat m_{t+1}}{\sqrt{\hat v_{t+1}} + \epsilon}$$

An update rule can be rewritten in the incremental form:

$$w_{t+1} = w_0 - \eta \sum_{i=1}^{t+1} \frac{\hat m_i}{\sqrt{\hat v_i} + \epsilon} = w_0 - \eta \sum_{i=1}^{t+1} \frac{\sum_{j=0}^{i-1} \frac{\partial}{\partial w}L_j(w_j)\beta_1(1 - \beta_1)^{i-j-1}}{\left(\sqrt{\hat v_i} + \epsilon\right)(1 - \beta_1^{i-1})}$$

The Tylor expansion of $$\frac{\partial}{\partial w}L_{t+1}(w_{t+1})$$

can be written as:

$$\frac{\partial}{\partial w}L_{t+1}(w_{t+1}) = \frac{\partial}{\partial w}L_{t+1}(w_t) + \frac{\partial^2}{\partial w}L_{t+1}(w_t)(w_{t+1} - w_t) + O(\alpha^2) =$$

$$\frac{\partial}{\partial w}L_{t+1}(w_t) - \frac{\partial^2}{\partial w}L_{t+1}(w_t) \cdot \eta \sum_{j=0}^{t} \frac{\frac{\partial}{\partial w}L_j(w_j)\beta_1(1-\beta_1)^{t-j}}{\left(\sqrt{\hat{v}_t} + \epsilon\right)(1-\beta_1^t)}$$

From the above expressions, the gradient that is employed by reptile can be:

$$\frac{\phi_0 - \phi_{t+1}}{\eta} = \sum_{i=1}^{t+1}\sum_{j=0}^{i-1} c_{ij} \frac{\partial}{\partial \phi} L_j(\phi_j)$$

$$\text{where } c_{ij} = \frac{\beta_1(1-\beta_1)^{i-j-1}}{\left(\sqrt{\hat{v}_i} + \epsilon\right)(1-\beta_1^{i-1})}$$

Alg. 2 (presented above) describes an algorithm for computing the hyper-gradient using reverse method that implements an approximation of the bi-level problem resulting from the application of the reptile cost function to both levels.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method of continual learning in an artificial intelligence system through bi-level optimization, the method comprising:
   providing a stored data sample of a current task;
   providing a neural network subdivided into two parts including a parameter part and a hyper-parameter part; and
   performing bi-level optimization by separately training the two parts of the neural network, wherein the neural network has been trained, prior to the bi-level optimization, on data samples of previous tasks from at least one different machine learning problem than the current task.

2. The method of claim 1, further comprising:
   after performing the bi-level optimization, iteratively batch training the neural network based on batches of data collectively comprising: (i) at least some of the previous task data samples and (ii) the stored current task data sample.

3. The method of claim 1, wherein performing the bi-level optimization comprises:
   iteratively training the parameter part of the neural network with a first data set and a first cost function; and
   iteratively training the hyper-parameter part of the neural network with a different second data set and a different second cost function;
   wherein one of the first data set and the second data set comprises the stored current task data sample and the other of the first data set and the second data set comprises one or more of: (i) the stored current task data sample and (ii) at least some of the previous task data samples.

4. The method of claim 3, wherein performing the bi-level optimization comprises:
   defining the training of the two parts of the neural network as a bi-level problem and applying a bi-level optimization solver;
   wherein the bi-level problem is defined with respect to the first and second cost functions such that the optimization resulting from the bi-level optimization solver causes the parameter part of the neural network to learn one or more new tasks while the hyper-parameter part of the neural network retains performance for previously learned tasks.

5. The method of claim 1, wherein performing the bi-level optimization comprises:
   iteratively training the parameter part of the neural network with data specific to a subset of a group of multiple tasks; and
   iteratively training the hyper-parameter part of the neural network with validation data common to each of the multiple tasks;
   wherein the group of multiple tasks comprises the current task and at least some of the previous tasks; and
   wherein the subset of the group of multiple tasks comprises the current task.

6. The method of claim 1, wherein the bi-level optimization through separate training comprises:
   training the parameter part of the neural network based on data specific to the current task; and
   training the hyper-parameter part of the neural network based on data common to the current task and the previous tasks.

7. The method of claim 6, wherein the parameter part comprises one or more first layers of the neural network and the hyper-parameter part comprises one or more different second layers of the neural network.

8. The method of claim 6, wherein after training the parameter part of the neural network based on data specific to the current task and training the hyper-parameter part of the neural network based on data common to the current task and the previous tasks, the bi-level optimization through separate training comprises:

training the parameter part of the neural network based on data specific to either a further task or one of the previous tasks; and where the training the parameter part of the neural network is based on data specific to the further task, training the hyper-parameter part of the neural network based on data common to the further task, current task, and the previous tasks; or where the training the parameter part of the neural network is based on data specific to one of the previous tasks, training the hyper-parameter part of the neural network based on data common to the current task and the previous tasks.

9. The method of claim 1, wherein the bi-level optimization through separate training comprises:

training the parameter part of the neural network based on first training data, but not on second training data; and training the hyper-parameter part of the neural network based on the first training data and the second training data;

wherein the first training data comprises the stored current task data sample and the second training data comprises stored previous task data samples.

10. The method of claim 9, wherein the parameter part comprises one or more first layers of the neural network and the hyper-parameter part comprises one or more different second layers of the neural network.

11. The method of claim 10, wherein the one or more first layers comprise an exit layer of the neural network and the one or more second layers comprise a plurality of hidden layers of the neural network.

12. The method of claim 9, wherein after training the parameter part of the neural network based on the first training data and training the hyper-parameter part of the neural network based on the first training data and the second training data, the bi-level optimization through separate training further comprises:

training the parameter part of the neural network based on third training data, but not on the first training data or the second training data; and training the hyper-parameter part of the neural network based on the third training data, the first training data, and the second training data;

wherein the third training data comprises a stored next task data sample.

13. The method of claim 1, wherein providing the neural network subdivided into two parts including the parameter part and the hyper-parameter part comprises:

selecting the parameter part from a plurality of options based on data captured by a sensor.

14. A tangible, non-transitory computer-readable medium having instructions thereon which, upon being executed by one or more processors, alone or in combination, provide for execution of the method of claim 1.

15. A system comprising one or more processors, which alone or in combination, are configured to provide for performance of a method comprising:

providing a stored data sample of a current task;

providing a neural network subdivided into two parts including a parameter part and a hyper-parameter part; and performing bi-level optimization by separately training the two parts of the neural network, wherein the neural network has been trained, prior to the bi-level optimization, on data samples of previous tasks from at least one different machine learning problem than the current task.

16. The system of claim 15, wherein the one or more processors, alone or in combination, are further configured to provide for performance of:

after performing the bi-level optimization, iteratively batch training the neural network based on batches of data collectively comprising: (i) at least some of the previous task data samples and (ii) the stored current task data sample.

17. The system of claim 15, wherein performing the bi-level optimization comprises:

iteratively training the parameter part of the neural network with a first data set and a first cost function; and iteratively training the hyper-parameter part of the neural network with a different second data set and a different second cost function, wherein one of the first data set and the second data set comprises the stored current task data sample and the other of the first data set and the second data set comprises one or more of: (i) the stored current task data sample and (ii) at least some of the previous task data samples.

* * * * *